United States Patent Office 3,708,534
Patented Jan. 2, 1973

3,708,534
PROCESS FOR THE PREPARATION OF ω-HYDROXY SATURATED ALIPHATIC MONOCARBOXYLIC ACIDS OF 4 TO 12 CARBON ATOMS
Sachio Ishimoto, Tokyo, and Haruo Togawa, Yuitsu Honda, and Noritsugu Saiki, Iwakuni, Japan, assignors to Teijin Limited, Umeda, Kita-ku, Osaka, Japan
No Drawing. Filed Mar. 19, 1970, Ser. No. 21,173
Int. Cl. C07c 59/04
U.S. Cl. 260—535 R 8 Claims

ABSTRACT OF THE DISCLOSURE

Omega-hydroxy saturated aliphatic monocarboxylic acids of 4–12 carbons are prepared with high conversion and high selectivity by single stage reaction by contacting a saturated aliphatic dicarboxylic acid of 4–12 carbons, together with 0.3–20 times its weight of a saturated aliphatic glycol of the same carbon numbers as of the dicarboxylic acid, with hydrogen, in the presence of a cobalt catalyst which has been sintered at the temperatures ranging from 1000–1750° C. and thereafter reduced, at a temperature within the range of 180–300° C. under a pressure as will provide a partial pressure of hydrogen within the range of 10–80 kg./cm.$^2$.

---

This invention relates to a process for the preparation of ω-hydroxy saturated aliphatic monocarboxylic acids of 4–12 carbons. More particularly, the invention relates to a novel process of hydrogenating saturated aliphatic dicarboxylic acids of 4–12 carbons to produce ω-hydroxy saturated aliphatic monocarboxylic acids of the same carbon numbers as of the starting dicarboxylic acids.

Conventional processes for making ε-hydroxycaproic acid, which is a ω-hydroxy saturated aliphatic monocarboxylic acid containing 6 carbons, include, for example, the following two as the most widely practiced.

(a) Reaction of cyclohexanone with peracetic acid to first form ε-caprolactone, which is then hydrolyzed to form ε-hydroxycaproic acid; and (b) Oxidation of cyclohexane or mixtures thereof with cyclohexanone with air, in the absence of solvent and catalyst, whereby obtaining substantially 50:50 mixtures of ε-hydroxycaproic acid with adipic acid.

However, in the above process (a), expensive and explosive peracetic acid must be employed and the process is furthermore deficient in that acetic acid is side-produced. Also the process (b) has the drawback of side-producing adipic acid of approximately equal amount of object ε-hydroxycaproic acid.

Accordingly, therefore, the object of the present invention is to provide a novel process for selectively producing, from a saturated aliphatic dicarboxylic acid of 4–12 carbons, the corresponding ω-hydroxy saturated aliphatic monocarboxylic acid (i.e., the acid containing the same number of carbons as of the starting dicarboxylic acid) by single stage reaction.

Particularly, the object of the present invention is to provide a novel process for converting adipic acid to ε-hydroxycaproic acid, with high conversion and high selectivity, by single stage reaction.

Still other objects and advantages of the invention will become apparent from the following descriptions.

According to the invention, ω-hydroxy saturated aliphatic monocarboxylic acid of 4–12 carbons can be prepared with high yield and high selectivity, by contacting a saturated, aliphatic dicarboxylic acid of 4–12 carbons, together with 0.3–20 weight times thereof of a saturated aliphatic glycol containing the same number of carbons as of the dicarboxylic acid, with hydrogen, in the presence of a cobalt catalyst which has been sintered at 100–1750° C. and thereafter subjected to a reducing treatment, at a temperature within the range of 180–300° C., and a pressure as will provide a partial pressure of hydrogen of 10–80 kg./cm.$^2$.

Hereinafter the invention will be described in fuller details.

Starting material and reacting agent

In the present invention, saturated aliphatic dicarboxylic acids containing 4–12 carbons of the formula, $$HOOC-(CH_2)_n-COOH \qquad (1)$$

in which $n$ is a positive integer of 2–10 are used as the starting material.

According to the invention, one of the above-specified dicarboxylic acids is hydrogenated, together with 0.3–20 weight times thereof, preferably 0.5–5 weight times thereof, of a saturated aliphatic glycol containing the equal number of carbons as of the starting dicarboxylic acid, which is represented by the formula, $$HO-(CH_2)_m-OH \qquad (2)$$

in which $m$ is a positive integer of 4–12, under the later specified conditions. Thus ω-hydroxy saturated aliphatic monocarboxylic acid of the same carbon numbers as of the above-specified starting dicarboxylic acid is prepared. In this specification, hereinafter the term, "corresponding," is used to signify that the two substances have equal number of carbons.

The dicarboxylic acids to be employed in the present invention, the glycols to be added to the reaction system together with the acids, and ω-hydroxymonocarboxylic acids whereby formed, are listed in the table below:

TABLE

| Carbon number | Starting material | Glycol to be added | Product |
|---|---|---|---|
| 4 | Succinic acid | 1,4-butanediol | 4-hydroxybutyric acid. |
| 5 | Glutaric acid | 1,5-pentanediol | 5-hydroxyvaleric acid. |
| 6 | Adipic acid | 1,6-hexanediol | 6-hydroxycaproic acid. |
| 7 | Pimelic acid | 1,7-heptanediol | 7-hydroxy-heptanoic acid. |
| 8 | Suberic acid | 1,8-octanediol | 8-hydroxycaprylic acid. |
| 9 | Azelaic acid | 1,9-nonanediol | 9-hydroxy-pelargonic acid. |
| 10 | Sebacic acid | 1,10-decanediol | 10-hydroxy-decanoic acid. |
| 11 | 1,9-nonanedicarboxylic acid. | 1,11-undecanediol | 11-hydroxy-undecanoic acid. |
| 12 | 1,10-decanedicarboxylic acid. | 1,12-dodecanediol | 12-hydroxylauric acid. |

Catalyst

The hydrogenation reaction of the invention is performed in the presence of sintered, reduced cobalt catalyst which is obtained by the steps of sintering cobalt oxide in oxygen-containing gas at temperatures ranging from 1000° C.–1750° C., and reducing the resulting cobalt oxide in hydrogen-containing atmosphere. According to our researches, the sintering temperature significantly affects the conversion of starting dicarboxylic acid. When the cobalt catalyst sintered at temperatures below 1000° C. is used in the hydrogenation reaction, conversion of the dicarboxylic acid drops abruptly. Whereas, if the sintering temperature exceeds 1750° C., a part of the cobalt oxide is melted, and the catalyst shows reduced level of activity. Incidentally, the cobalt oxide obtained as the result of sintering is believed to be composed chiefly of $CoO \cdot Co_2O_3$. When the sintering temperature is selected from the range of 1100–1600° C., cobalt catalyst of higher activity can be obtained, and starting dicarboxylic acids can be advantageously converted to the corresponding hydroxy acids at higher conversions.

The sintered, reduced cobalt catalyst employed in the invention can be prepared by compression molding, for example, cobalt oxide, or a cobalt compound which can form cobalt oxide at the above-specified sintering temperatures, such as cobalt nitrate, hydroxide, carbonate, etc., into cylindrical or granular form, for example; sintering the molded product in an oxygen-containing gas such as air, at temperatures ranging from 1000–1750° C., preferably 1100–1600° C.; and thereafter reducing the cobalt oxide in hydrogen gas-containing atmosphere. The effectiveness of said reducing treatment can be confirmed by formation of water upon the reduction of said cobalt oxide resulting from the sintering. It is advantageous to carry out the reducing treatment as thoroughly as possible, until the formation of water completely terminates. Preferably, the reducing treatment is performed under heating, at temperatures ranging, e.g., 280–500° C., inter alia, 300–400° C.

Such sintered, reduced cobalt catalyst can be satisfactorily used in the invention so far as it is composed mainly of cobalt. The catalytic activity of the catalyst can be maintained at approximately the same level with that of the catalyst which is 100% cobalt, when it contains no more than 20% by weight, particularly no more than 10% by weight, of other metallic component, such as manganese, copper, chromium, etc.

The sintered, reduced cobalt catalyst may be bound onto an inert carrier such as, for example, alumina, silica, diatomaceous earth, pumice, etc. In order to form such carrier-bound catalyst, for example, powdered cobalt oxide may be mixed with powdered alumina, compression molded as aforesaid, sintered, and reduced with hydrogen. Or, the carrier as aforesaid may be immersed in an aqueous solution of water-soluble cobalt compound such as cobalt nitrate, followed by drying, sintering, and reduction with hydrogen by the order stated.

Reaction conditions

As already mentioned, the saturated, aliphatic dicarboxylic acid and 0.3–20 weight times thereof, preferably 0.5–5 weight times thereof, of the corresponding glycol are contacted with hydrogen in the presence of aforesaid sintered, reduced cobalt catalyst, at temperatures ranging from 180–300° C., preferably 200–270° C., under a pressure as will provide 10–80 kg./cm.$^2$, preferably 20–60 kg./cm.$^2$, of partial pressure of hydrogen, in accordance with the present invention.

In the subject process, if the quantity of said glycol is less than 0.5 weight time, particularly less than 0.3 weight time, of the starting dicarboxylic acid, the selectivity for the object ω-hydroxymonocarboxylic acid is lowered, and side-formation of corresponding glycol is increased. Whereas, if the quantity of said glycol exceeds 5 weight times, particularly 20 weight times, of the dicarboxylic acid, it becomes difficult to maintain high conversion of the dicarboxylic acid, i.e., the yield of the corresponding ω-hydroxymonocarboxylic acid is reduced.

In the preparation of ω-hydroxymonocarboxylic acid according to the present invention, the reaction temperature and partial pressure of hydrogen within the reaction system are also important factors. At the reaction temperatures below 200° C., particularly below 180° C., conversion of the dicarboxylic acid is lowered. Whereas, when it exceeds 270° C., particularly 300° C., side reactions such as hydrogenolysis are promoted. Consequently, side-formation of, for example, monohydric alcohols containing less number of carbons than the object ω-hydroxymonocarboxylic acids is increased, and selectivity for the object product is lowered.

Again, when the partial pressure of hydrogen in the reacsystem at the specified reaction temperature range is below 20 kg./cm.$^2$, particularly below 10 kg./cm.$^2$, conversion of the dicarboxylic acid is lowered. Whereas, if the partial pressure of hydrogen exceeds 60 kg./cm.$^2$, particularly 80 kg./cm.$^2$, selectivity for the object ω-hydroxymonocarboxylic acid is lowered, and side-production of corresponding glycol is increased.

Accordingly, all the characteristics features mentioned in the above, i.e., the concurrent presence of specified quantity of the glycol corresponding to the dicarboxylic acid employed as the starting material, presence of the described sintered and reduced cobalt catalyst, and the contact of starting dicarboxylic acid with hydrogen at 180–300° C., preferably at 200–270° C., while maintaining the partial pressure of hydrogen, calculated as that under the employed reaction temperature, at 10–80 kg./cm.$^2$, preferably 20–60 kg./cm.$^2$, are important requirements for producing the object ω-hydroxymonocarboxylic acid with high yield and high selectivity.

Furthermore, the conversion of starting dicarboxylic acid can be still improved by the concurrent presence of water in the described reaction system, in an amount not exceeding 10 molar times, particularly 0.5–3 molar times, the dicarboxylic acid. When the water amounts to 10 molar times or more to the dicarboxylic acid, conversion of the dicarboxylic acid can be further improved, but with reduced selectivity for the object ω-hydroxymonocarboxylic acid. Therefore, presence of excessive amount of water should be avoided.

According to our researches, it has been confirmed that under the above-specified reaction conditions, dehydrogenation reaction of saturated aliphatic glycols of 4–12 carbons (alkanediols) to form corresponding ω-hydroxymonocarboxylic acids is also actively promoted. Therefore, under the reaction conditions employed in the subject process, not only the hydrogenation of starting dicarboxylic acid to form corresponding ω-hydroxymonocarboxylic acid progresses, but also the further hydrogenation of the ω-hydroxymonocarboxylic acid to form corresponding glycol, taking place as an objectionable side reaction, is very effectively inhibited. Furthermore, in certain cases a part of the glycol which is initially added to the reaction system together with the dicarboxylic acid is also converted to the object ω-hydroxymonocarboxylic acid. Thus in accordance with the present invention, it is possible to obtain the object ω-hydroxymonocarboxylic acid at a yield higher than the maximum yield theoretically calculated from the quantity of dicarboxylic acid converted during the reaction.

According to the invention, therefore, ω-hydroxymonocarboxylic acid can be formed with surprisingly high selectivity and high conversion.

The reaction for making from saturated aliphatic dicarboxylic acid the corresponding alkanediol at high yields is known from, for example, U.S. Pat. No. 3,344,196 and British Pat. No. 1,094,727. Such known processes, however, are ineffective for making ω-hydroxy saturated aliphatic monocarboxylic acid with high selectivity, as achieved by the subject invention. No process for directly making ω-hydroxymonocarboxylic acid from dicarboxylic acid with high selectivity and high conversion is heretofore known. In this sense the subject invention must be regarded as the first disclosure of a complete, novel process for making ω-hydroxymonocarboxylic acid from dicarboxylic acid with high selectivity and high conversion.

Thus, according to the invention, it is also possible to use as the starting material, for example, not only a dicarboxylic acid, e.g., adipic acid alone, but also the adipic acid-containing oxidation product obtained by oxidizing cyclohexane with molecular oxygen following the method described in prior art already mentioned, for example, British Pat. No. 935,029. Also the adipic acid-containing extract obtained by extracting the above oxidation product with water and/or 1,6-hexanediol may be likewise used. Obviously, if 1,6-hexanediol is used as the extracting agent, the amount of 1,6-hexanediol in the extract must be adjusted to 0.3–20 weight times, preferably 0.5–5 weight times, the adipic acid, before the hydrogenation of said extract in accordance with the subject invention.

In the above-described manner, ε-hydroxycaproic acid can be prepared from cyclohexane by two-stage process, with high relativity and high yield, as a valuable application of the present invention. Incidentally, a part of the formed ε-hydroxycaproic acid is contained in the reaction product in the form of an oligomer thereof and/or 1,6-hexanediol ester of ε-hydroxycaproic acid or an oligomer thereof. The above statement also applies to other ω-hydroxymonocarboxylic acids formed in accordance with the subject process.

Various methods are available for the separation and recovery of thus formed ω-hydroxymonocarboxylic acids. For example, an alkali such as caustic soda, caustic potash, etc. may be added to the aforesaid reaction product, to hydrolyze the oligomer of ω-hydroxymonocarboxylic acid and the esters of said monocarboxylic acid and oligomer thereof under normally employed saponifying conditions, and thereafter the saturated, aliphatic glycol is removed from the hydrolyzed liquid by distillation or extraction. ω-Hydroxymonocarboxylic acid can be separated from the resulting aqueous solution of alkali salts of the aliphatic dicarboxylic acid and ω-hydroxymonocarboxylic acid, by the steps of adding a mineral acid such as hydrochloric or sulfuric acid to said aqueous solution of alkali salts to adjust the latter's pH to 4.5–6.5, selectively extracting ω-hydroxymonocarboxylic acid therefrom with an extracting agent such as cyclohexanol, and removing the extracting agent from the extract, as proposed in British Pat. No. 1,078,385.

Particularly, for separating ω-hydroxycaproic acid from the reaction product obtained by hydrogenation of adipic acid, the process comprising removing low boiling point substances such as water, etc. from the reaction product and heating the remaining system at temperatures ranging from 180–340° C. under reduced pressures ranging from 0.1–300 mm. Hg, can be very effectively applied to recover ω-hydroxycaproic acid as ω-caprolactone with ease.

The use of sintered, reduced cobalt catalyst in the subject process may be practiced in any form of fixed bed, fluidized bed, or moving bed.

The process of this invention can be practiced either batchwise or continuously, and the reaction system can be contacted with hydrogen gas either as counter-currents or parallel currents.

Hereinafter the subject process will be explained in further details with reference to working examples, it being understood that the scope of this invention is in no sense restricted thereby.

EXAMPLE A (a) Preparation of catalyst

Cobalt oxide was compression molded, heated in air at 1050° C. for an hour, and the resulting sintered cobalt oxide was reduced in hydrogen current at 320° C. until generation of water substantially terminated. Thus sintered and reduced cobalt was used as the catalyst in the synthesis described below.

(b) Synthesis of ε-hydroxycaproic acid

Thirty (30) g. of adipic acid, 50 g. of 1,6-hexanediol, 5 g. of water, and the sintered and reduced cobalt obtained through the procedures described in (a) above, of the amount corresponding to 70 g. of the sintered cobalt oxide before the reduction, were charged in a vertical agitation type, stainless steel autoclave of 500 cc. in capacity. Further hydrogen gas was fed into the autoclave to an elevated pressure of 50 kg./cm.$^2$ G., and then the reactants were heated and reacted at 210° C. for 2.5 hours.

The partial pressure of hydrogen after the reaction was 52 kg./cm.$^2$ G. Upon analysis, the resulting reaction mixture was found to contain 7.55 g. of adipic acid and 18.4 g. of ε-hydroxycaproic acid. The conversion of adipic acid was 75 mol percent, and the selectivity for ε-hydroxycaproic acid was 92 mol percent.

The reaction mixture also contained 49.8 g. of 1,6-hexanediol. Thus the amount of 1,6-hexanediol showed very little change before and after the reaction.

EXAMPLE B

Above Example A was repeated, except that the hydrogen gas was fed at an elevated pressure of 25 kg./cm.$^2$ G., and the reaction was performed at 220° C. for 3 hours. As the result, the conversion of adipic acid was 57 mol percent and the selectivity for ε-hydroxycaproic acid was 100 mol percent. The reaction mixture contained 48.0 g. of 1,6-hexanediol.

EXAMPLE C

The reaction of Example A was repeated 40 times. Thereafter the activity of the catalyst was observed to be somewhat reduced. Then 30 g. of adipic acid and 50 g. of 1,6-hexanediol were charged into the autoclave, and reacted under the identical conditions with those of Example A except that the reaction temperature was 270° C. and reaction time was 45 minutes. As the result, the conversion of adipic acid was 54 mol percent and the selectivity for ε-hydroxycaproic acid was 86 mol percent. The reaction mixture contained 47.5 g. of 1,6-hexanediol.

EXAMPLE D

Eighty (80) g. of a carboxylic acid mixture obtained by liquid phase oxidation of cyclohexane, which was composed of 40 wt. percent of ε-hydroxycaproic acid, 40 wt. percent of adipic acid, and 20 wt. percent of other carboxylic acids; 100 g. of 1,6-hexanediol, 8 g. of water, and the sintered and reduced cobalt catalyst obtained in Example A of the amount corresponding to 70 g. of the sintered cobalt oxide before the reduction, were charged in a vertical agitation type, stainless steel autoclave of 500 cc. in capacity. Further hydrogen gas was charged into the autoclave at a elevated pressure of 42 kg./cm.$^2$ G., and the system was reacted at 210° C. for 5 hours. Upon analysis of the resulting reaction mixture, it was found that the conversion of adipic acid was 80 mol percent, and the selectivity for ε-hydroxycaproic acid, 91 mol percent. The reaction mixture also contained 102 g. of 1,6-hexanediol.

EXAMPLE E (Significance of sintering and reducing temperatures)

Compression molded cobalt oxide was sintered in air, ground to the average size of 2–3 mm. in diamter, and 70 g. of which was reduced with hydrogen gas. The sintering and reducing conditions were varied for each run as indicated in Tables 1–1 and 1–2 below. Each of thus obtained sintered and reduced cobalt catalyst, 42 g. of adipic acid (0.288 mol), 70 g. of 1,6-hexanediol (0.593 mol), and 7 g. of water (0.389 mol) were charged in a vertical agitation type, stainless steel autoclave of 300 cc. in capacity. Then hydrogen gas was charged at an elevated pressure of 60 kg./cm.$^2$ G. (or 70 kg./cm.$^2$ G.), and the system was reacted at 210° C. (or 220° C. or 230° C.) for 3 hours in every run.

The analysis results of thus obtained reaction mixtures are shown in Tables 1–1 and 1–2 below, in which ΔHDO/HDO is the difference between the hexanediol content (mol) of the reaction mixture and the charged amount of hexanediol (mol) before the reaction, divided by the hexanediol (mol) present before the reaction. Theoretically, the maximum value of ΔHDO/HDO is 0.49. It is clear that in substantially all runs the amount of 1,6-hexanediol before and after the reaction was unchanged.

TABLE 1-1

| Run No | E-1* | E-2* | E-3* | E-4 | E-5 | E-6 | E-7 | E-8 | E-9 | E-10 |
|---|---|---|---|---|---|---|---|---|---|---|
| Sintering conditions: | | | | | | | | | | |
| Temp. (° C.) | 500 | 900 | 950 | 1,000 | 1,050 | 1,050 | 1,050 | 1,200 | 1,200 | 1,200 |
| Time (hr.) | 4 | 4 | 4 | 1 | 1 | 1 | 1 | 1 | 1 | 1 |
| Reduction temp. of catalyst (° C.) | 330 | 330 | 330 | 330 | 300 | 300 | 360 | 280 | 300 | 330 |
| Reaction temp. (° C.) | 210 | 210 | 210 | 230 | 210 | 210 | 210 | 220 | 210 | 210 |
| Pressure of charged hydrogen (kg./cm.$^2$ G.) | 60 | 60 | 60 | 60 | 60 | 60 | 60 | 70 | 60 | 60 |
| Partial pressure of hydrogen at the end of reaction (kg./cm.$^2$ G.) | 86 | 69 | 43 | 32 | 19 | 20 | 22 | 28 | 18 | 20 |
| ε-Hydroxycaproic acid produced (mol) | 0.021 | 0.045 | 0.085 | 0.153 | 0.166 | 0.159 | 0.158 | 0.224 | 0.186 | 0.195 |
| 1,6-hexanediol in reaction mixture: | | | | | | | | | | |
| Mol | 0.482 | 0.551 | 0.558 | 0.548 | 0.624 | 0.616 | 0.608 | 0.500 | 0.597 | 0.634 |
| ΔHDO/HDO (mol/mol) | −0.19 | −0.07 | −0.06 | −0.08 | +0.05 | +0.04 | +0.03 | −0.16 | +0.01 | +0.07 |
| Conversion of adipic acid (mol percent) | 30.0 | 32.6 | 47.9 | 57.6 | 59.7 | 55.9 | 54.2 | 76.7 | 65.3 | 65.3 |
| Selectivity for ε-hydroxycaproic acid (mol percent) | 81.8 | 47.9 | 61.6 | 92.2 | 96.5 | 98.8 | 101.1 | 101.4 | 98.9 | 103.7 |

NOTE.—In the table above, runs marked with * are controls.

TABLE 1-2

| Run No | E-11 | E-12 | E-13 | E-14 | E-15 | E-16 | E-17 |
|---|---|---|---|---|---|---|---|
| Sintering conditions: | | | | | | | |
| Temp. (° C.) | 1,200 | 1,200 | 1,200 | 1,350 | 1,500 | 1,600 | 1,700 |
| Time (hr.) | 1 | 1 | 1 | 1 | 1 | 1 | 1 |
| Reduction temp. of catalyst (° C.) | 360 | 400 | 450 | 330 | 330 | 330 | 330 |
| Reaction temp. (° C.) | 210 | 220 | 220 | 210 | 220 | 210 | 210 |
| Pressure of charged hydrogen (kg./cm.$^2$ G.) | 60 | 70 | 70 | 60 | 70 | 60 | 60 |
| Partial pressure of hydrogen at the end of reaction (kg./cm.$^2$ G.) | 18 | 25 | 26 | 20 | 26 | 22 | 23 |
| ε-Hydroxycaproic acid produced (mol) | 0.183 | 0.094 | 0.180 | 0.197 | 0.213 | 0.195 | 0.181 |
| 1,6-hexanediol in reaction mixture: | | | | | | | |
| Mol | 0.623 | 0.559 | 0.566 | 0.617 | 0.536 | 0.586 | 0.580 |
| ΔHDO/HDO (mol/mol) | +0.05 | −0.06 | −0.05 | +0.04 | −0.10 | −0.01 | −0.02 |
| Conversion of adipic acid (mol percent) | 63.9 | 74.0 | 70.8 | 68.1 | 70.8 | 69.1 | 65.6 |
| Selectivity for ε-hydroxycaproic acid (mol percent) | 99.5 | 91.1 | 88.2 | 100.5 | 104.4 | 98.0 | 95.8 |

EXAMPLE F (Significance of hydrogen pressure)

(a) Preparation of sintered and reduced cobalt catalyst

Cobalt oxide was compression molded, heated in air at 1050° C. for an hour, and the resulting sintered cobalt oxide was ground to the average size of 2–3 mm. in diameter. Then the sintered cobalt oxide was reduced in hydrogen current at 320° C. until generation of water substantially terminated.

(b) Synthesis of ε-hydroxycaproic acid

Adipic acid, 1,6-hexanediol, and water of the amounts indicated in Table 2 below, and the sintered and reduced cobalt catalyst obtained in (a) above of the amount corresponding to 70 g. of the sintered cobalt oxide before the reduction, were charged in a vertical agitation type autoclave of 500 cc. in capacity, and reacted under the conditions also shown in Table 2 below, with the corresponding reaction results.

In Table 2, HDO/AA and H₂O/AA correspond respectively to the amount of 1,6-hexanediol and of water, each to the charged amount of adipic acid.

TABLE 2

| Run No | F-1 | F-2 | F-3 | F-4 | F-5 | F-6* |
|---|---|---|---|---|---|---|
| Adipic acid g. (mol) | 30 (0.205) | 30 (0.205) | 30 (0.205) | 30 (0.205) | 33 (0.226) | 60 (0.411) |
| 1,6-hexanediol: | | | | | | |
| G. (mol.) | 10 (0.085) | 48.3 (0.409) | 48.3 (0.409) | 48.3 (0.409) | 50 (0.423) | 50 (0.427) |
| HDO/AA (g./g.) | 0.33 | 1.61 | 1.61 | 1.61 | 1.51 | 0.83 |
| Water: | | | | | | |
| G. (mol.) | | 4.6 (0.256) | 4.6 (0.256) | 7.4 (0.410) | 17.0 (0.944) | 10 (0.555) |
| H₂O/AA (mol/mol) | 0 | 1.24 | 1.24 | 2.00 | 4.18 | 1.35 |
| Reaction temp. (° C.) | 210 | 200 | 210 | 200 | 210 | 200 |
| Reaction time (hr.) | 3 | 3 | 4 | 4 | 2 | 2 |
| Pressure of charged hydrogen (kg./cm.$^2$ G.) | 25 | 30 | 45 | 60 | 80 | 200 |
| Partial pressure of hydrogen at the end of reaction (kg./cm.$^2$ G.) | 19 | 28 | 37 | 40 | 63 | 172 |
| ε-Hydroxycaproic acid produced (mol) | 0.102 | 0.134 | 0.133 | 0.133 | 0.153 | 0.135 |
| 1,6-hexanediol in reaction mixture: | | | | | | |
| Mol | 0.081 | 0.394 | 0.410 | 0.415 | 0.468 | 0.661 |
| ΔHDO/HDO (mol/mol) | −0.05 | −0.04 | +0.00 | +0.01 | +0.11 | +0.55 |
| Conversion of adipic acid (mol percent) | 55.1 | 61.5 | 70.7 | 67.3 | 87.6 | 86.8 |
| Selectivity for ε-hydroxycaproic acid (mol percent) | 90.3 | 106.3 | 91.7 | 96.4 | 77.3 | 37.8 |

NOTE.—In the table above, the run marked with * is control.

EXAMPLE G (Significance of the quantity of saturated aliphatic glycol added)

Adipic acid, 1,6-hexanediol, and water of the amounts indicated in Table 3 below, and the sintered and reduced cobalt catalyst obtained by reducing, at 330° C., 70 g. of cobalt oxide which had been sintered and ground under the conditions described in (a) of foregoing Example F, were charged in a vertical agitation type stainless steel autoclave of 300 cc. (or 500 cc.) in capacity, and reacted under the conditions indicated in Table 3 below. The results are also shown in the same table.

TABLE 3

| Run No | G-1* | G-2 | G-3 | G-4 | G-5 | G-6 | G-7 |
| --- | --- | --- | --- | --- | --- | --- | --- |
| Capacity of autoclave (cc.) | 500 | 500 | 500 | 300 | 300 | 300 | 300 |
| Adipic acid g. (mol) | 30 (0.205) | 30 (0.205) | 30 (0.205) | 42 (0.288) | 42 (0.288) | 30 (0.205) | 15 (0.103) |
| 1,6-hexanediol: | | | | | | | |
| G. (mol) | | 10 (0.085) | 48.3 (0.409) | 70 (0.593) | 102 (0.864) | 120 (1.02) | 180 (1.53) |
| HDO/AA (g./g.) | 0 | 0.33 | 1.61 | 1.67 | 2.43 | 4.00 | 12.0 |
| Water: | | | | | | | |
| G. (mol) | | | 7.4 (0.410) | 7 (0.389) | 7 (0.389) | 5 (0.278) | 2.5 (0.139) |
| H₂O/AA (mol/mol) | 0 | 0 | 2.00 | 1.35 | 1.35 | 1.36 | 1.36 |
| Reaction temperature (° C.) | 210 | 210 | 200 | 220 | 220 | 220 | 220 |
| Reaction time (hr.) | 3 | 3 | 4 | 3 | 3 | 3 | 3 |
| Pressure of charged hydrogen (kg./cm.² G.) | 25 | 25 | 60 | 70 | 70 | 70 | 70 |
| Partial pressure of hydrogen at the end of reaction (kg./cm.² G.) | 14 | 19 | 40 | 24 | 31 | 39 | 59 |
| ε-Hydrocaproic acid produced (mol) | 0.075 | 0.102 | 0.133 | 0.201 | 0.169 | 0.143 | 0.122 |
| 1,6-hexanediol in reaction mixture: | | | | | | | |
| G. (mol) | 0.051 | 0.081 | 0.415 | 0.631 | 0.811 | 1.01 | 1.39 |
| ΔHDO/HDO (mol/mol) | | −0.05 | +0.01 | +0.06 | −0.06 | −0.01 | −0.09 |
| Conversion of adipic acid (mol percent) | 75.6 | 55.1 | 67.3 | 70.1 | 62.8 | 62.4 | 70.9 |
| Selectivity for ε-hydroxycaproic acid (mol percent) | 48.4 | 90.3 | 96.4 | 99.5 | 93.4 | 111.7 | 167.1 |

NOTE.—In the table, the run marked with * is control.

EXAMPLE H (Significance of quantity of water)

(a) Preparation of sintered and reduced cobalt. Cobalt oxide was compression molded, heated in air at 1200° C. for an hour, and the resulting sintered cobalt oxide was ground to the size of 2–3 mm. in diameter. Thus ground, sintered cobalt oxide was reduced in hydrogen current at 300° C., until generation of water substantially terminated.

(b) Synthesis of ε-hydroxycaproic acid.—Adipic acid, 1,6-hexanediol, and water of the amounts indicated in Table 4 below, and the sintered and reduced cobalt catalyst obtained in (a) above, of the amount corresponding to 70 g. of the sintered cobalt oxide before the reduction, were charged in a vertical agitation type, stainless steel autoclave of 300 cc. in capacity, and reacted at 220° C. for 3 hours, under the conditions indicated in Table 4 below. The results are given in the same table.

The results demonstrate that, as the amount of water is increased, the catalytic activity tends to be reduced.

and the sintered and reduced cobalt catalyst prepared under the conditions indicated in Table 5 below, of the amount corresponding to 70 g. of the sintered cobalt oxide before the reduction. The synthesis of ε-hydroxycaproic acid was performed under the conditions shown also in Table 5, with the results given in the same table.

TABLE 5

| Run No | I-1 | I-2 | I-3 | I-4 |
| --- | --- | --- | --- | --- |
| Sintering conditions: | | | | |
| Temp. (° C.) | 1,200 | 1,200 | 1,200 | 1,050 |
| Time (hr.) | 1 | 1 | 1 | 1 |
| Reducing temp. of catalyst (° C.) | 300 | 330 | 330 | 360 |
| Reaction temp. (° C.) | 170 | 190 | 210 | 290 |
| Reaction time (hr.) | 3 | 3 | 3 | 2.7 |
| Pressure of charged hydrogen (kg./cm² G.) | 60 | 60 | 60 | 70 |
| Partial pres. of hydrogen at the end of reac. (kg./cm² G.) | 61 | 40 | 20 | 137 |
| ε-Hydroxycaproic acid produced (mol) | 0.069 | 0.102 | 0.195 | 0.175 |
| 1,6-hexanediol in rect. mixture: | | | | |
| Mol | 0.586 | 0.612 | 0.590 | 0.098 |
| ΔHDO/HDO (mol/mol) | −0.01 | +0.03 | −0.01 | −0.83 |
| Conversion of adipic acid (mol percent) | 32.6 | 40.3 | 65.3 | 55.2 |
| Selectivity for ε-hydroxycaproic acid (mol percent) | 73.4 | 87.9 | 103.7 | 110.1 |

TABLE 4

| Run No | H-1 | H-2 | H-3 | H-4 | H-5 | H-6 | H-7 |
| --- | --- | --- | --- | --- | --- | --- | --- |
| Adipic acid g.(mol) | 42 (0.288) | 42 (0.288) | 42 (0.288) | 42 (0.288) | 42 (0.288) | 42 (0.288) | 42 (0.288) |
| 1,6-hexanediol: | | | | | | | |
| G.(mol) | 70 (0.593) | 70 (0.593) | 70 (593) | 70 (0.593) | 70 (0.593) | 70 (0.593) | 70 (0.593) |
| HDO/AA (g./g.) | 1.67 | 1.67 | 1.67 | 1.67 | 1.67 | 1.67 | 1.67 |
| Water: | | | | | | | |
| G.(mol) | 7 (0.389) | 10.3 (0.572) | 20.6 (1.14) | 20.6 (1.14) | 41.2 (2.28) | 51.8 (2.88) | 77.7 (4.32) |
| H₂O/AA (mol/mol) | 1.35 | 2.00 | 4.00 | 4.00 | 8.00 | 10 | 15 |
| Pressure of charged hydrogen (kg./cm.² G.) | 70 | 70 | 70 | 50 | 50 | 50 | 50 |
| Partial pressure of hydrogen at the end of reaction (kg./cm.² G.) | 25 | 26 | 27 | 24 | 25 | 25 | 24 |
| ε-Hydroxycaproic acid produced (mol) | 0.221 | 0.229 | 0.238 | 0.221 | 0.187 | 0.173 | 0.158 |
| 1,6-hexanediol in reaction mixture: | | | | | | | |
| Mol | 0.473 | 0.552 | 0.543 | 0.516 | 0.532 | 0.536 | 0.586 |
| ΔHDO/HDO (mol/mol) | −0.20 | −0.07 | −0.08 | −0.13 | −0.10 | −0.10 | −0.01 |
| Conversion of adipic acid (mol percent) | 75.7 | 69.8 | 70.1 | 61.8 | 59.0 | 51.4 | 46.9 |
| Selectivity for ε-hydroxycaproic acid (mol percent) | 101.4 | 113.9 | 117.8 | 124.1 | 110.0 | 116.9 | 117.0 |

EXAMPLE I (Significance of reaction temperature)

A stainless steel autoclave of 300 cc. in capacity was charged with 42 g. of adipic acid (0.288 mol), 30 g. of 1,6-hexanediol (0.593 mol), 7 g. of water (0.389 mol),

EXAMPLE J (ω-Hydroxymonocarboxylic acids other than that of 6 carbons)

The reaction was performed under the conditions given in Table 6 below, using as the saturated aliphatic dicarboxylic acid, succinic acid, azelaic acid, sebacic acid, and decanedicarboxylic acid, together with each corresponding glycol, i.e., 1,4-butanediol, 1,9-nonanediol, 1,10-decanediol and 1,12-dodecanediol, respectively. The results are given in the same table.

TABLE 6

| Saturated aliphatic dicarboxylic acid | Run No. | | | |
|---|---|---|---|---|
| | J-1 | J-2 | J-3 | J-4 |
| | Succinic acid.* | Azelaic acid. | Sebacic acid. | Decanedicarboxylic acid. |
| Number of carbons | 4 | 9 | 10 | 12 |
| Sintering conditions: | | | | |
| Temp. (° C.) | 1,200 | 1,050 | 1,050 | 1,050 |
| Time (hr.) | 1 | 1 | 1 | 1 |
| Reducing temp. of catalyst (° C.) | 300 | 320 | 320 | 320 |
| Dicarboxylic acid (g.) | 42 | 11.8 | 7.7 | 22.8 |
| Glycol (g.) | 70 | 20 | 20 | 20 |
| Water (g.) | 7 | 3.8 | 3.1 | 5.9 |
| Capacity of autoclave (cc.) | 300 | 500 | 500 | 500 |
| Reaction temp. (° C.) | 220 | 210 | 210 | 210 |
| Reaction time (hr.) | 3 | 3 | 3 | 3 |
| Pressure of charged hydrogen (kg./cm.² G.) | 60 | 40 | 40 | 40 |
| Partial pres. of hydrogen at the end of reaction (kg./cm.² G.) | 27 | 50 | 52 | 52 |
| Conversion of dicarboxylic acid (mol percent) | 57 | 50 | 52 | 42 |
| Selectivity for ω-hydroxy-monocarboxylic acid (mol percent) | 101 | 87 | 102 | 130 |

EXAMPLE K (Experiments using, as the starting material of sintered cobalt oxide, cobalt compounds other than cobalt oxide)

(a) Preparation of sintered, reduced cobalt.—As the cobalt source, cobalt hydroxide and metal cobalt were used, which were compression molded and heated in air at 1050° C. for an hour. The preparation of catalyst was performed similarly to (a) of Example F, except that the reduction was effected at 330° C.

(b) Synthesis of ε-hydroxycaproic acid.—The reaction was performed similarly to Example F, except that the catalyst therein was replaced by the sintered and reduced cobalt prepared in (a) above. The results are given in Table 7 below.

TABLE 7

| Run No. | K-1 | K-2 |
|---|---|---|
| Cobalt source | Co(OH)₂ | Co metal |
| Pressure of charged hydrogen (kg./cm.² G.) | 70 | 70 |
| Partial pressure of hydrogen at the end of reaction (kg./cm.² G.) | 34 | 34 |
| ε-Hydroxycaproic acid produced (mol) | 0.239 | 0.205 |
| 1,6-Hexanediol in reaction mixture: | | |
| Mol | 0.422 | 0.581 |
| Δ HDO/HDO (mol/mol) | −0.29 | −0.02 |
| Conversion of adipic acid (mol percent) | 74.0 | 71.2 |
| Selectivity for ε-hydroxy caproic acid (mol percent) | 112.2 | 100.0 |

EXAMPLE L (Cases wherein metals other than cobalt were added to the catalyst)

(a) Preparation of catalyst.—Cobalt oxide was mixed with oxides of various metals indicated in Table 8 below, and the mixtures were compression molded. The molded products were first sintered, and ground to the average size of 2–3 mm. in diameter, followed by reduction in hydrogen current, under the conditions also given in Table 8.

(b) Synthesis of ε-hydroxycaproic acid.—A vertical agitation type stainless steel autoclave of 300 cc. in capacity was charged with 42 g. of adipic acid (0.288 mol), 70 g. of 1,6-hexanediol (0.593 mol), 7 g. of water (0.389 mol), and each of the catalyst prepared in (a) above of the amount corresponding to 70 g. of the sintered product before the reduction. The system in the autoclave was reacted at 230° C. for 3 hours, under the conditions shown in Table 8, with the results also given in the same table.

TABLE 8

| Run No. | L-1 | L-2 | L-3 |
|---|---|---|---|
| Metal added (wt. percent) | Cu:10 | Cu: 5 Mu:5 | Al:20 |
| Sintering conditions: | | | |
| Temp. (° C.) | 1,050 | 1,050 | 1,350 |
| Time (hr.) | 1 | 1 | 1 |
| Reducing temp. of catalyst (° C.) | 200–300 | 300 | 330 |
| Pressure of charged hydrogen (kg./cm.² G.) | 60 | 60 | 70 |
| Partial pressure of hydrogen at the end of reaction (kg./cm.² G.) | 32 | 45 | 64 |
| ε-Hydroxycaproic acid produced (mol) | 0.142 | 0.103 | 0.152 |
| 1,6-hexanediol in reaction mixture: | | | |
| Mol | 0.591 | 0.587 | 0.425 |
| Δ HDO/HDO (mol/mol) | −0.00 | −0.01 | −0.28 |
| Conversion of adipic acid (mol percent) | 52.4 | 41.7 | 60.1 |
| Selectivity for ε-hydroxycaproic acid (mol percent) | 94.0 | 85.8 | 87.9 |

EXAMPLE M (An example wherein 1,6-hexanediol and water only were used as the reactants)

A stainless steel autoclave of 300 cc. in capacity was charged with 70 g. of 1,6-hexanediol (0.593 mol), 7 g. of water (0.389 mol), and sintered and reduced cobalt prepared in the manner described in (a) of Example A except that the sintering temperature employed was 1200° C. and reducing temperature was 300° C., of the amount corresponding to 70 g. of the sintered cobalt oxide before reduction. Further hydrogen gas was fed into the autoclave to an elevated pressure of 10 kg./cm.² G., and the system was reacted at 230° C. for 2 hours. The total pressure in the autoclave at the end of reaction was 60 kg./cm.² G., and the partial pressure of hydrogen was approximately 52 kg./cm.² G. Upon analysis, the resulting reaction mixture was found to contain 0.107 mol of ε-hydroxycaproic acid, which corresponds to a yield of 18% to the charged 1,6-hexanediol. Incidentally, if this type of reaction took place concurrently in Example E–9, the above result corresponds to the improvement in selectivity for ε-hydroxycaproic acid of approximately 60%.

EXAMPLE N (An example employing ester or polyester of adipic acid with 1,6-hexanediol as the starting material of reaction)

(a) Synthesis of cyclization residue. — Low boiling point substances such as water were removed from 340 g. of the reaction mixture identical with that obtained in Example A. Further the greatest part of free 1,6-hexanediol was removed at 120° C. under a reduced pressure of 1 mm. Hg to leave 230 g. of the residue. One-third of the residue was charged in a vessel of 200 cc. in capacity equipped with a packed rectification column having 9 theoretical plates, and reacted at 240° C. for 3 hours under a pressure of 30 mm. Hg. Whereupon 0.178 mol of ε-hydroxycaproic acid was recovered as ε-caprolactone, together with 33.7 g. of 1,6-hexanediol, from the top of the rectification column. In the vessel, 0.068 mol of adipic acid, 0.010 mol of ε-hydroxycaproic acid, and 0.120 mol of 1,6-hexanediol remained. The above procedures were repeated 3 times, to yield a cyclization residue containing 0.205 mol of adipic acid, 0.030 mol of ε-hydroxycaproic acid, and 0.360 mol of 1,6-hexanediol.

The adipic acid in said cyclization residue was a polyester of low degree of polymerization with 1,6-hexanediol.

(b) Synthesis of ε-hydroxycaproic acid. — A stainless steel autoclave of 500 cc. in capacity was charged with 67.8 g. of the cyclization residue obtained above, 9.7 g. of water, 7.7 g. of 1,6-hexanediol, and the catalyst prepared in (a) of Example A of the amount corresponding to 70 g. of the sintered cobalt oxide before reduction. Further hydrogen gas was charged into the autoclave to an elevated pressure of 50 kg./cm.² G., followed by 4 hours' reaction at 235° C. Upon analysis, the resulting reaction mixture was found to contain 0.077 mol of adipic acid, 0.152 mol of ε-hydroxycaproic acid and 0.407 mol of 1,6-hexanediol. Substracting from the above 0.030 mol of ε-hydroxycaproic acid which was already contained in the cyclization residue used as the starting material, the conversion of adipic acid in the above reaction was 62.4 mol percent, with the selectivity for ε-hydroxycaproic acid of 95.3 mol percent.

We claim:
1. A process for the preparation of ω-hydroxy saturated, aliphatic, monocarboxylic acids of 4 to 12 carbon atoms which comprises contacting a saturated, aliphatic dicarboxylic acid of 4 to 12 carbon atoms, together with 0.3 to 20 weight times thereof of a saturated, aliphatic glycol of the same carbon number as the dicarboxylic acid, with hydrogen at a temperature within the range of from 180 to 300° C. under a pressure that provides a partial pressure of hydrogen within the range of from 10 to 80 kg./cm.$^2$ in the presence of a catalyst obtained by sintering in an oxygen-containing gas atmosphere, at a temperature ranging from 1000 to 1750° C. metallic cobalt or a cobalt compound which forms cobalt oxide at the sintering temperature, to thereby form cobalt oxide, and thereafter reducing the resulting cobalt oxide under hydrogen.

2. The process of claim 1 wherein water in an amount not exceeding 10 molar times the amount of dicarboxylic acid is present in the reaction system.

3. The process of claim 1 wherein the amount of water present in the reaction system ranges from 0.5 to 8 molar times the amount of dicarboxylic acid.

4. The process of claim 1 wherein the sintering temperature ranges from 1100 to 1600° C., and the reducing treatment is performed at 280 to 500° C.

5. The process of claim 1 wherein the saturated, aliphatic dicarboxylic acid is contacted with hydrogen together with 0.5 to 5 weight times the saturated, aliphatic dicarboxylic acid of the saturated, aliphatic glycol, at a temperature within the range of 200 to 270° C. and a pressure that provides a partial pressure of hydrogen of 20 to 60 kg./cm.$^2$.

6. The process of claim 1 wherein an adipic acid-containing oxidation product obtained by oxidizing cyclohexane with molecular oxygen is used as the saturated, aliphatic dicarboxylic acid of 6 carbon atoms.

7. The process of claim 1 wherein an adipic acid-containing extract obtained through the steps of oxidizing cyclohexane with molecular oxygen, and extracting the resulting liquid oxidation product with water, 1,6-hexanediol, or a mixture thereof, is used as the saturated, aliphatic dicarboxylic acid of 6 carbon atoms.

8. The process of claim 1 wherein said saturated, aliphatic dicarboxylic acid is used in the form of an ester with a saturated, alphatic glycol containing the same number of carbon atoms as said dicarboxylic acid.

References Cited
UNITED STATES PATENTS

| | | | |
|---|---|---|---|
| 1,962,140 | 6/1934 | Dreyfus | 260—535 |
| 2,904,584 | 9/1959 | Payne | 260—535 |

LORRAINE A. WEINBERGER, Primary Examiner

P. J. KILLOS, Assistant Examiner

U.S. Cl. X. R.

252—466 R, 474; 260—343, 413, 484 A, 635 D